United States Patent [19]

Sischka

[11] 3,865,741

[45] Feb. 11, 1975

[54] PROCESS FOR PRODUCING MAGNETIC TAPE COATING

[75] Inventor: Frederic J. Sischka, Santa Clara, Calif.

[73] Assignee: Memorex Corp., Santa Clara, Calif.

[22] Filed: Nov. 7, 1973

[21] Appl. No.: 413,615

[52] U.S. Cl............ 252/62.54, 117/235, 260/42.54, 260/42.56
[51] Int. Cl. ........................................... H01j 1/113
[58] Field of Search................ 252/62.54; 117/235; 260/42.54, 42.56

[56] References Cited
UNITED STATES PATENTS

| | | | |
|---|---|---|---|
| 3,144,352 | 8/1964 | Talley | 252/62.54 |
| 3,247,017 | 4/1966 | Eichler et al. | 117/235 |
| 3,649,541 | 3/1972 | Ingersoll | 252/62.54 |
| 3,650,828 | 3/1972 | Higashi et al. | 117/235 |

Primary Examiner—Daniel E. Wyman
Assistant Examiner—A. P. Demers

[57] ABSTRACT

Magnetic coating compositions consisting of magnetic iron oxide dispersed in a resin mixture comprising a major proportion of vinylidene chloride-acrylonitrile copolymer containing in excess of 50% by weight vinylidene chloride and a minor proportion of a polyurethane resin are produced by milling a slurry of a magnetic iron oxide having an appreciable content of ferrous iron in a solution of polyurethane resin to produce an agglomerate-free dispersion of magnetic iron oxide in the solution and then intimately mixing the dispersion with a solution of the vinylidene chloride-acrylonitrile polymer.

1 Claim, No Drawings

PROCESS FOR PRODUCING MAGNETIC TAPE COATING

BACKGROUND OF THE INVENTION

U.S. Pat. No. 3,144,352 describes a long wear magnetic recording medium comprising a plastic base and an adherent coating, including a magnetic pigment dispersed in a resin mixture. The resin mixture is a mixture of a polyurethane resin and a copolymer of vinylidene chloride and acrylonitrile in which the polyurethane resin content is at least 5% of the total resin mixture.

Polyurethane resins are made by reacting a diisocyanate, a dicarboxylic acid and an alkane diol in proportions such that all of the isocyanate groups have reacted to give a substantially unreactive polymer.

The vinylidene chloride-acrylonitrile copolymers contain in excess of 50% by weight vinylidene chloride and are sold by Dow Chemical Company under the trade name Saran Resins.

Polyurethane resins manufactured and sold by B. F. Goodrich under the trade names of ESTANE 5740-X-1 and X-2 are prepared by reacting p-p'-diphenylmethane diisocyanate, adipic acid and butane diol-1,4 are extensively used in preparing these resin mixtures.

Magnetic coating compositions employing the resin mixtures described in the above noted patent have had an impressive commercial success.

Since the introduction of magnetic coatings of the kind described in U.S. Pat. No. 3,144,352 acicular gamma ferric oxides have been developed which can be dispersed in a number of binder systems to produce a magnetic tape coating which makes possible production of magnetic tapes having considerably improved performance properties. Difficulty, however, has been experienced in attempting to produce an acceptable magnetic tape coating using the improved gamma ferric oxides with the binder system described in U.S. Pat. No. 3,144,352.

When magnetic coatings are prepared using the newly developed gamma ferric oxides and conventional milling procedure as described in the above identified patent, i.e., forming a solution of a mixture of the vinylidene chloride-acrylonitrile resin and the polyurethane resin, adding the gamma ferric oxide and small amounts of conventional additives such as suspending agents, fungicides, plasticizers, and lubricants and then subjecting the mixture to the customary extended vigorous milling procedure, it is found that initially the tape produced by coating with the resultant mixture is satisfactory but that the system is not stable. During storage the tape coating increases in tensile strength and in brittleness and there is a detectable loss of chlorine from the binder in the form of hydrogen chloride. The tape life is not commercially acceptable.

DESCRIPTION OF THE INVENTION

It has been found that some of the improved gamma ferric oxides as they reach the market contain appreciable amounts of ferrous iron adhering to the ferric oxide. The ferrous iron appears to be in the form of ferrous hydroxychloride or ferrous oxychloride. These materials appear to be present in amounts such that the gamma ferric oxide has a ferrous iron content above 100 ppm and up to about 1500 ppm. At the elevated temperatures reached in the milling process this small amount of ferrous iron appears to catalyze or induce reactions which cause loss of tensile strength and development of brittleness when the tape is stored. The reaction system is complex and the reactions which result in poor storage properties are difficult to pin down. It is known, however, that the presence of ferrous iron as an impurity on the gamma ferric oxide, is the source of the storage difficulty and it is known that these difficulties are overcome by following the process steps described hereinafter, an important feature of the process being that the vinylidene chloride-acrylonitrile copolymer is kept out of contact with the gamma ferric oxide during the entire milling procedure.

A detailed description of the preparation of a magnetic tape coating composition follows.

Resin Solution 1, Slurry for Mill Feed and Resin Solution 2 having the following compositions in parts by weight were prepared.

| Component | Weight/Parts |
|---|---|
| Resin Solution No. 1 | |
| 1. Cyclohexanone | 22.5557 |
| 2. ESTANE X-1 | 1.2256 |
| 3. Xylene | 5.6389 |
| Total | 29.4202 |
| Slurry/Mill Feed | |
| 1. Resin No. 1 | 29.4324 |
| 2. Soya Lecithin (dispersant) | 0.6924 |
| 3. Metasol-57* | 0.0046 |
| 4. Oxide-MO2228** | 23.0800 |
| Total | 53.2094 |

*Diphenyl mercuric ammonium propionate fungicide by Metal States Corp.
**Oxide MO2228 is an acicular gamma ferric oxide sold by Pfizer Chemical Co. It contains approximately 1250 ppm ferrous iron predominantly in the form of FeOHCl.

| | |
|---|---|
| Resin Solution No. 2 | |
| 1. Cyclohexanone | 33.4436 |
| 2. Saran F-130* | 4.9025 |
| 3. Xylene | 8.3855 |
| Total | 46.7316 |

*Saran F-130 is a product of Dow Chemical Co. It is a vinylidene chloride-acrylonitrile copolymer containing about 85% by weight of vinylidene chloride.

Resin Solution No. 1 Make Up a. 2.2556 kg of cyclohexanone is transferred to a pretared stainless steel container.

b. Stirring is started with a Cowles mixer (7 inch blade) at 700 rpm.

c. 0.1226 kg of ESTANE resin X-1 is slowly added to the stirring mixture. Stirring is continued for 3 hours to assure complete solution of the polyurethane.

d. Upon completion of the 3 hour stir period, 0.5639 kg of xylene is added with stirring continuing for 15 minutes.

Slurry/Mill Feed a. The 2.9432 kg of resin solution No. 1 thus prepared is stirred while adding the following components.

b. 69.24g of soya lecithin added over 5 minutes.

c. 0.5g of metasol-57 is added to mix over 5 minutes.

d. 2.3080 kg of MO2228 oxide is added with stirring over a 15 minute period.

e. Stirring is continued at 1500 rpm for a further time of 30 minutes.

Milling a. The slurry, as prepared above in Step 2, is placed in the feed tank for milling
b. The perl mill (Drais) is started and cooling water is adjusted to minimum flow.
c. Mix feed pump is started and flow rate on the mill is adjusted to 2 gph. The first slurry through the mill is discarded as mill purge.
d. Continue milling at 2 gph until the feed pot is empty. Shut down the mill and transfer the first pass material into the feed pot.
e. Start the mill and feed pump and continue as above (without purge) for passes 2, 3 and 4.
f. At the conclusion of pass 4, remove samples for viscosity and optical examination of dispersion quality.

Resin Solution No. 2 Make Up a. 3.3444 kg of cyclohexanone is transferred to a pre-tared stainless steel container.
b. Stirring is started with a Cowless mixer (7 inch blade) at 700 rpm.
c. 490.25g of saran resin F-130 is slowly added to the stirring mixture. Stirring is continued for 2 hours to assure complete solution of the polymer.
d. Upon completion of the 2 hour stir period, 838.55g of xylene is added with stirring continued for 15 minutes.

Letdown to Final Mix a. The dispersion prepared in milling step 3 is weighed to the nearest 10 gram increment.
b. Stirring is started with a Cowles mixer (7 inch blade) at 700 rpm.
c. The dispersion weight is multiplied by 0.88 to calculate the weight of resin No. 2 to be added for letdown. This amount of resin No. 2 is added with stirring over a 30 minute period and stirring is continued for a further 30 minutes after addition is completed.
d. Final letdown weight is noted and multiplied by 0.0006 to obtain both the weights of butoxyethyl stearate plasticizer and silicone oil lubricant to be added. The silicone is a dimethyl polysiloxane having a viscosity 1000cs at 25°C. Both oils are stirred in over a 15 minute period and stirring continues for another 15 minutes.
e. Mix is ready for coating procedures.

Finished tapes employing the magnetic coating produced by the process above described have been compared with finished tapes in which both the polyurethane and the vinylidene chloride-acrylonitrile polymers were present with the magnetic iron oxide having ferrous iron contamination (ca 1200 ppm) during the milling step. All finished tapes compared were products of commercial scale production. The tapes produced pursuant to the process of this invention showed consistently improved high frequency response. The improvement in a number of comparative tests lay in the range 10 to 18%.

A further advantage of finished tapes prepared pursuant to the invention over those prepared in conventional manner, i.e., subjecting a slurry containing both resin components of the binder system to the necessary rigorous milling procedure is shown by the results of the shuttle test. This test consists in subjecting the tapes to 20 wind-unwind cycles and determining the strength of the high frequency signal before and after the wind-unwind cycling. Sixty-five percent of the tapes prepared in conventional manner showed a loss in high frequency signal strength of 2 decibels or more, while only 30 percent of the tapes prepared pursuant to the invention showed strength losses of 2 decibels or more.

The process of the present invention clearly results in a significant improvement in tape quality.

In Resin Solutions No. 1 and No. 2 cyclohexanone and xylene function as solvents. These are the preferred solvents but other organic solvents having the capability to dissolve the polyurethane and vinylidene chloride-acrylonitrile polymers may be substituted.

The polyurethane is the reaction product of a diisocyanate, an alkane dicarboxylic acid and an alkane diol in proportions such that essentially all of the isocyanate groups have reacted so that the polymer is substantially unreactive. The Estanes produced by B. F. Goodrich by reaction of p-p'-diphenylmethane diisocyanate, adipic acid and butanediol 1-4 are preferred but other polyurethanes of comparable hardness (60–90 Durometer A) and tensile strength (4500–6500 psi at 73.4F) may be used.

The vinylidene chloride-acrylonitrile polymers contain in excess of 50% by weight vinylidene chloride, preferably 80–90% vinylidene chloride. The Saran resins produced by Dow Chemical Co., e.g., Saran F-120, Saran F-130 and Saran F-220 are excellent binding resins.

I claim:

1. In a process for producing a magnetic tape coating composition magnetic iron oxide particles dispersed in a resin mixture comprising a major proportion of a vinylidene chloride-acrylonitrile copolymer containing in excess of 50% by weight of vinylidene chloride and a minor proportion of a polyurethane resin the improvement which comprises milling a slurry of magnetic iron oxide having an appreciable content of ferrous iron in a solution of polyurethane resin for a time sufficient to produce a dispersion of magnetic iron oxide in the solution, which dispersion is substantially free of magnetic iron oxide agglomerates and then intimately mixing the dispersion with a solution of the vinylidene chloride-acrylonitrile polymer.

* * * * *